United States Patent
Robbins et al.

(10) Patent No.: US 9,164,290 B2
(45) Date of Patent: Oct. 20, 2015

(54) GRATING CONFIGURATIONS FOR A TILED WAVEGUIDE DISPLAY

(71) Applicant: MICROSOFT TECHNOLOGY LICENSING, LLC, Redmond, WA (US)

(72) Inventors: Steve J. Robbins, Bellevue, WA (US); Ian A. Nguyen, Renton, WA (US)

(73) Assignee: MICROSOFT CORPORATION, Redmond, WA (US)

( * ) Notice: Subject to any disclaimer, the term of this patent is extended or adjusted under 35 U.S.C. 154(b) by 182 days.

(21) Appl. No.: 14/073,746

(22) Filed: Nov. 6, 2013

(65) Prior Publication Data

US 2015/0125109 A1     May 7, 2015

(51) Int. Cl.
G02B 27/42 (2006.01)
G02B 27/01 (2006.01)
G02B 5/18 (2006.01)

(52) U.S. Cl.
CPC ............ *G02B 27/4205* (2013.01); *G02B 27/01* (2013.01); *G02B 27/0172* (2013.01); *G02B 5/1828* (2013.01); *G02B 2027/0123* (2013.01)

(58) Field of Classification Search
CPC .................................................. G02B 27/4205
See application file for complete search history.

(56) References Cited

U.S. PATENT DOCUMENTS

| 4,711,512 A | 12/1987 | Upatnieks |
| 5,856,842 A | 1/1999 | Tedesco |
| 6,317,228 B2 | 11/2001 | Popovich et al. |
| 6,323,970 B1 | 11/2001 | Popovich |
| 6,580,529 B1 | 6/2003 | Amitai et al. |
| 6,909,826 B2 | 6/2005 | Cai et al. |
| 7,184,615 B2 | 2/2007 | Levola |
| 7,421,163 B1 | 9/2008 | Tong et al. |
| 7,576,916 B2 | 8/2009 | Amitai |
| 8,160,411 B2 | 4/2012 | Levola et al. |
| 8,224,133 B2 | 7/2012 | Popovich et al. |

(Continued)

FOREIGN PATENT DOCUMENTS

| WO | 2012172295 A1 | 12/2012 |
| WO | WO 2015069553 A1 * | 5/2015 ............. G02B 27/01 |

OTHER PUBLICATIONS

Grego, et al., "Novel Optical-waveguide Sensing Platform based on Input Grating", In Proceedings of SPIE—Integrated Optics: Devices, Materials, and Technologies X, vol. 6123, Feb. 15, 2006, 11 pages.

"Volume Hologram Diffraction Efficiency," [online] retrieved from the Internet: http://www2.engr.arizona.edu/~ece527/Coupled%20Wave.pdf, Sep. 12, 2013, 27 pages.

Massenot et al., "Multiplexed Holographic Transmission Gratings Recorded in Holographic Polymer-Dispersed Liquid Crystals: Static and Dynamic Studies", Applied Optics, vol. 44, Issue 25, Sep. 2005.

(Continued)

*Primary Examiner* — Andrew Jordon
(74) *Attorney, Agent, or Firm* — Judy Yee; Micky Minhas

(57) ABSTRACT

Grating configurations are described for creating time sequenced field of view (FOV) tiles for a waveguide display. Pairings of non-output diffraction gratings and output diffraction gratings are activated to create a number of FOV tiles in a time sequence, for example in a frame update period for the image. Examples of a non-output grating are an input grating and a fold grating. For a set of at least three gratings used to make the pairings, each non-output grating is paired with each output grating. The number of pairings, and so the number of FOV tiles, is equal to a product of the total number of non-output gratings and the total number of output gratings. At least one diffraction grating in the pairing is an active pairing. Also described is a multiplexed diffraction grating including multiplexed K-vectors which increases the overall angular bandwidth for both incidence and diffraction.

20 Claims, 11 Drawing Sheets

(56) References Cited

U.S. PATENT DOCUMENTS

| | | | |
|---|---|---|---|
| 8,233,204 | B1 | 7/2012 | Robbins et al. |
| 8,611,014 | B2 | 12/2013 | Valera et al. |
| 8,817,350 | B1 | 8/2014 | Robbins et al. |
| 8,885,997 | B2 * | 11/2014 | Nguyen et al. ............ 385/37 |
| 2003/0179998 | A1 | 9/2003 | Zhang et al. |
| 2005/0105902 | A1 | 5/2005 | Alavie et al. |
| 2007/0041684 | A1 | 2/2007 | Popovich et al. |
| 2010/0296163 | A1 | 11/2010 | Saarikko |
| 2014/0010265 | A1 | 1/2014 | Peng |
| 2014/0064655 | A1 * | 3/2014 | Nguyen et al. ............ 385/11 |
| 2014/0104665 | A1 | 4/2014 | Popovich et al. |
| 2014/0140653 | A1 | 5/2014 | Brown et al. |
| 2014/0140654 | A1 | 5/2014 | Brown et al. |
| 2014/0168260 | A1 * | 6/2014 | O'Brien et al. ............ 345/633 |
| 2014/0168735 | A1 * | 6/2014 | Yuan et al. ............ 359/12 |
| 2014/0184699 | A1 | 7/2014 | Ito et al. |
| 2014/0204455 | A1 | 7/2014 | Popovich et al. |
| 2014/0240842 | A1 * | 8/2014 | Nguyen et al. ............ 359/630 |
| 2014/0300966 | A1 * | 10/2014 | Travers et al. ............ 359/558 |
| 2014/0327970 | A1 * | 11/2014 | Bohn et al. ............ 359/630 |
| 2015/0125109 | A1 * | 5/2015 | Robbins et al. ............ 385/10 |

OTHER PUBLICATIONS

Zharkova et al., "Study of the Dynamics of Transmission Gratings Growth on Holographic Polymer-Dispersed Liquid Crystals", International Conference on Methods of Aerophysical Research, ICMAR, Aug. 2008.

Yan et al., "Multiplexing Holograms in the Photopolymer with Equal Diffraction Efficiency," Advances in Optical Data Storage Technology, Proceedings of SPIE, vol. 5643, (SPIE, Bellingham, WA), Jan. 2005.

Pu et al., "Exposure Schedule for Multiplexing Holograms in Photopolymer Films," Opt. Eng. 35(10), Oct. 1996.

Han et al., "Accurate Diffraction Efficiency Control for Multiplexed Volume Holographic Gratings", Opt. Eng. 41, Nov. 2002.

Minier et al., "Diffraction Characteristics of Superimposed Holographic Gratings in Planar Optical Waveguides", IEEE Photonics Technology Letters, vol. 4, No. 10, Oct. 1992.

Kress et al., "Exit Pupil Expander for Wearable See-Through Displays", Photonic Applications for Aerospace, Transportation, and Harsh Environment III, Proc. of SPIE vol. 8368, 83680D, May 1, 2012.

* cited by examiner

GRATING CONFIGURATIONS FOR A TILED WAVEGUIDE DISPLAY

BACKGROUND

Waveguides can be used in displays, in a variety of sizes, for example for televisions to near-eye displays (NED)s. A typical example of a near-eye display is a head mounted display (HMD).

In an exemplary waveguide display, for example one as exemplified by Upatnieks U.S. Pat. No. 4,711,512, light is coupled into a waveguide mode by an input diffractive element and coupled out to the eye by a second diffractive element. The practical field of view in which data can be displayed by a waveguide display is around thirty (30) degrees due to the range of angles that can be supported by the waveguide. For example, crown glass such as N-BK7 has a refractive index of approximately 1.52 which makes the critical angle for supporting total internal reflection approximately 42.2° in glass. At the other end of the range, light could go parallel to the waveguide surface but this would not be practical since the light would not intercept the second output diffractive element to enable out-coupling of the light. Furthermore, the period between reflections has to be managed such that no gaps can appear in the exit pupil (a balance between parameters such as entrance pupil size, angle of reflection and thickness of the waveguide. There is therefore a practical limit for the angle range beyond a critical angle.

One way of increasing the field of view (FOV) is to have multiple waveguide layers, each covering a different angular portion. If Bragg Gratings are used to couple light into and out of the waveguide, they typically have angular bandwidth limitations lower than what can be supported in the waveguide. For example, this could be limited to 10 degrees angular bandwidth In this spatial approach, the number of layers can start making the waveguide too thick for a consumer product. Another approach for expanding the field of view has been to use multiple switchable gratings for time sequentially generating the field of view fast enough so a user does not notice flicker. In a typical HMD geometry, whether using fixed or switchable gratings in either a spatial or time layering of the FOV, the angular bandwidth provided by each can go down to less than 10 degrees in the tangential direction.

SUMMARY

The technology provides embodiments of grating configurations for creating multiple field of view (FOV) tiles for a waveguide display. Some embodiments activate pairings of non-output gratings and output gratings to create a number of FOV tiles. At least one of the gratings in a pair or pairing is also in another pair or pairing. For example, a non-output grating and a first output grating may be activated in a first time period to produce a first FOV tile, and the first non-output grating and a second output grating may be activated during a second time period to produce a different second FOV tile. The number of FOV tiles generated is a product of a total number of non-output gratings and a total number of output gratings in the total number of pairings. At least one active diffractive grating is used in each pairing. An example of an active diffractive grating is a switchable Bragg grating.

The technology also provides for embodiments of a waveguide display including at least one diffraction grating with multiplexed K-vectors resulting in the overall angular bandwidth for incidence and diffraction of the multiplexed grating being increased.

The technology provides one or more embodiments of an apparatus using grating pairings for generating field of view (FOV) tiles for a waveguide display. An embodiment of the apparatus comprises a waveguide display and at least three diffraction gratings positioned within the waveguide display including at least one output diffraction grating for coupling light out from the waveguide and at least one non-output diffraction grating for coupling image light for traversal along inside the waveguide. At least three diffraction gratings forming a total number of grating pairings equal to a product of a total number of the non-output diffraction gratings and a total number of the output diffraction gratings in the number of grating pairings. Each pairing includes one non-output diffraction grating and one output diffraction grating, and the pairing includes at least one active grating. Each grating pairing includes at least one grating also in another grating pairing of the total number of grating pairings. A number of FOV tiles is equal to the number of grating pairings. Control circuitry is communicatively coupled to the at least one active grating in each pairing for activating each pairing during a respective tile time period of a larger FOV update time period and deactivating each pairing during respective tile time periods when other grating pairings are activated. Thus, the control circuitry controls generating the number of FOV tiles in the FOV update time period and ensures there is no crosstalk between the pairings that can degrade the output display image.

The technology provides one or more embodiments of a waveguide display system including at least one grating with multiplexed K-vectors. An embodiment of a waveguide display system including at least one grating with multiple grating K-vectors comprises a waveguide display optically coupled to an image generation unit for receiving image light for display, and at least three diffraction gratings positioned within the waveguide display including at least one output diffraction grating for coupling image light out from the waveguide and at least one non-output diffraction grating for coupling image light for traversal along the waveguide display. The at least three diffraction gratings forming a total number of grating pairings equal to a product of a total number of the non-output diffraction gratings and a total number of the output diffraction gratings in the total number of grating pairings. Each pairing includes one non-output grating and one output grating for generating a respective field of view (FOV) tile. At least one of gratings in the pairing is an active grating. Additionally, each grating pairing includes at least one grating also in another grating pairing of the total number of gratings. The at least three diffraction gratings includes a multiplexed grating including multiplexed K-vectors which allow the multiplexed grating to provide a greater than ten degree FOV tile. Control circuitry is communicatively coupled to the at least one active grating in each pairing for activating each pairing during a respective tile time period of a larger FOV update time period and deactivating each pairing during respective tile time periods when other grating pairings are activated for generating the number of FOV tiles in the FOV update time period.

The technology provides one or more embodiments of a method for displaying image for a waveguide display in time sequenced field of view (FOV) tiles using diffraction grating pairings, each diffraction grating pairing being associated with a respective FOV tile. An embodiment of the method comprises receiving by the waveguide display from an optically coupled image generation unit an image portion associated with the FOV tile for display during a time period which is a subperiod of a FOV update time period. A current grating pairing associated with the FOV tile is activated, the current grating pairing including a non-output diffraction grating and an output diffraction grating during the time period. During a tile transition time period, the current grating pairing is deactivated. The previous steps are repeated for a next grating pairing until each FOV tile has been displayed in the FOV update time period. At least one grating in each grating pairing is also in another grating pairing. The next grating pairing often includes either the current non-output diffraction grating or the current output diffraction grating.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
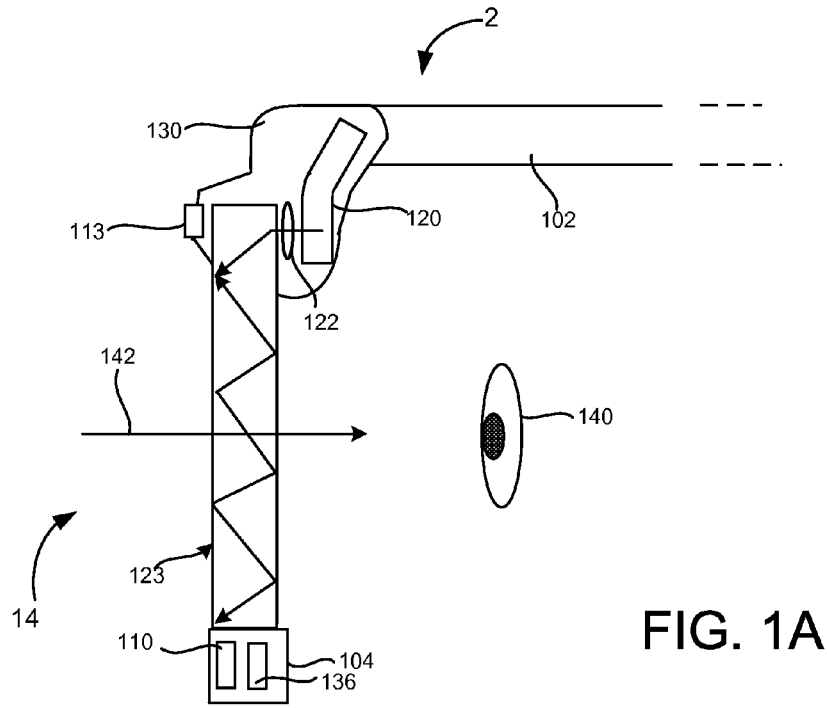
FIG. 1A is a top view of an embodiment of a near-eye display (NED) including an embodiment of a waveguide in which embodiments of the technology can operate.

Described herein is technology for expanding a field of view (FOV) of a waveguide display, and in particular for a waveguide based near-eye display (NED). In many embodiments, a waveguide is planar and made of optically transparent material such as glass or plastic. Light travels through a waveguide based on total internal reflection (TIR). However, in order for a user to see an image over a large exit pupil, some of the light continues travelling along the waveguide via TIR while portions of the image light are directed out of the waveguide along the length of the waveguide, for example towards a user eye area associated with a NED. The propagation paths of light in a waveguide are predetermined based on the principle of total internal reflection (TIR) and placement and activation of diffraction gratings within the waveguide structure for changing direction of light. A diffraction grating diffracts incident light received within an angular bandwidth of incidence θi. Light outside this incidence bandwidth passes through the grating rather than being diffracted and continues propagating in the waveguide. Additionally, a diffraction grating has a diffraction efficiency so even all light received within bandwidth θi is not diffracted but continues propagating down the waveguide.

In some embodiments described below, a waveguide display includes pairings of a non-output diffraction grating with an output diffraction grating, and at least one of the gratings in the pairing is active. A non-output diffraction grating couples light for traversal along the waveguide, and examples of a non-output diffraction grating are an input grating and a fold grating. An input grating couples light into a waveguide. In a multi-layered waveguide, an input grating can couple light which passed through another waveguide layer uncoupled into its associated waveguide layer. One or more fold gratings can be positioned within a waveguide layer. A fold grating redirects light received within its angular bandwidth of incidence θi. In some examples, a fold grating may be positioned to receive light from an input grating or an input lens system. An output grating couples light out of the waveguide in a predetermined direction, e.g. towards a viewer.

Some approaches use multiple waveguide layers with each layer having grating pairings. Time sequencing portions of an image into tiles of a field of view can be performed in each layer although sequencing the tiles in time can cut down on the number of layers used. A FOV tile incorporates a portion of the field of view and is associated with each pair of non-output diffraction grating and output diffraction grating. The number of pairings and therefore the number of FOV tiles generated is a product of a total number of non-output gratings and a total number of output gratings in the total number of pairings. The tiles are time sequenced within a time period, for example, a frame update time period, which is a small enough period so the human eye cannot discern flicker in the image. Before proceeding further on the arrangement of grating pairings and other grating optimizations within the waveguide, an overview of a near-eye display in which embodiments of the technology may be used is described. The technology can also be used in other types of displays using waveguides.

FIG. 1A is a top view of an embodiment of a waveguide near-eye display (NED) system 14 including a waveguide 123 and an image generation unit 120 optically coupled to the waveguide in a NED device 2. The near-eye display device 2 is in an eyeglasses form factor. Just a right side display system 14 and support components like housing 130, temple 102 and camera 113 are shown, but corresponding components may also be implemented for a left side display system. In order to show the components of the waveguide display system 14, a portion of a top frame section covering the components of the waveguide display system 14 is not depicted. Arrow 142 represents an optical axis of the waveguide display system 14. Eye space 140 approximates a location of a user's eye when the device 2 is worn.

In this embodiment, the waveguide display 123 is an optical see-through display, but in other embodiments, it can be a video-see display. The waveguide display 123 receives collimated image light from the image generation unit 120 via optically coupling collimating lens 122. The waveguide 123 directs the received image light towards the user eye space 140 while also allowing light from the real world to pass through towards the user's eye space, thereby allowing the user to have an actual direct view of the space in front of NED device 2 in addition to seeing an image of a virtual feature from the image generation unit 120.

In this overview drawing, details of layers and gratings are not shown to prevent overcrowding. More detailed embodiments of grating configurations are presented in the figures below.

In the illustrated embodiment, the image generation unit 120 is in a right side housing 130 which also supports an outward facing camera 113 which collects image data of the scene in front of the user. The housing 130 is also supported by a temple arm 102 of the eyeglasses. In this example, the image generation unit 120 includes one or more LEDs, and a microdisplay which produces the image light. Nose bridge 104 in this embodiment supports a microphone 110 and control circuitry 136. Electrical connections (not shown) are provided within the frame of the eyeglasses.

Figure 1B:
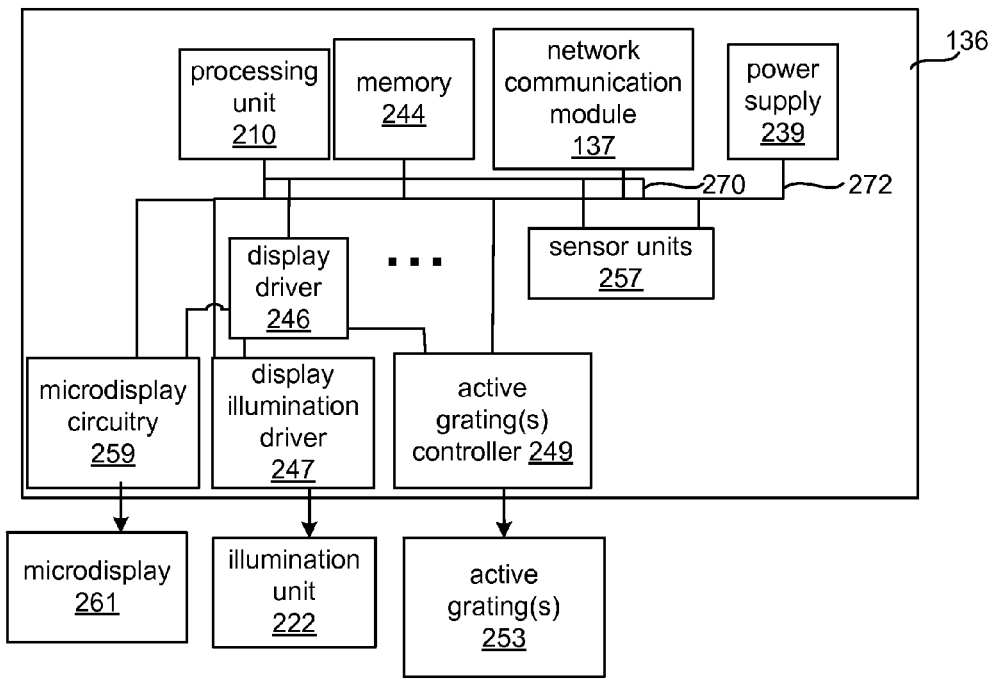
FIG. 1B is a block diagram of example hardware components including a computer system within control circuitry of a NED device.

FIG. 1B is a block diagram of example hardware components including a computer system within control circuitry of a NED device. Control circuitry 136 provides various electronics that support the other components of head mounted, near-eye display device 2. In this example, the control circuitry 136 for the display device 2 comprises a processing unit 210, a memory 244 accessible to the processing unit 210 for storing processor readable instructions and data, a communication module 137 communicatively coupled to the processing unit 210 which can act as a network interface for connecting the NED device to another computer system. A power supply 239 provides power for the components of the control circuitry 136 and the other components of the display device 2 like sensor units 257 which include capture devices 113, the microphone 110, and other power drawing components for displaying image data in the waveguide display 123 such as light sources and electronic circuitry associated with an image generation unit like a microdisplay 261 and an illumination unit 222 in the image generation unit 120.

The processing unit 210 may comprise one or more processors including a central processing unit (CPU) and a graphics processing unit (GPU). Memory 244 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications for which image light representing image data is generated. In this example, an electrical connection of a data bus 270 connects the sensor units 257, the display driver 246, processing unit 210, memory 244, and the communication module 137. The data bus 270 also derives power from the power supply 239 through a power bus 272 to which all the illustrated elements of the control circuitry are connected for drawing power.

The control circuitry further comprises the display driver 246 for selecting digital control data, e.g. control bits, to represent image data which digital control data may be decoded by microdisplay circuitry 259 and different active component drivers of the image generation unit 120 like an illumination unit 122. An example of an active component driver is a display illumination driver 247 which converts digital control data to analog signals for driving an illumination unit 222 which includes one or more light sources like one or more light emitting diodes (LEDs). A microdisplay may be an active transmissive, emissive or reflective device.

For example, a microdisplay may be a liquid crystal on silicon (LCoS) device requiring power or a micromechanical machine (MEMs) based device requiring power to move individual mirrors. In some embodiments, a display unit may include one or more active gratings 253 such as those described below. An active grating(s) controller 249 converts digital control data into signals for changing the properties of one or more gratings.

In some embodiments discussed below, the control circuitry 136 may include other control units not illustrated here but related to other functions of a NED device such as, for example, polarization control, providing audio output, identifying head orientation and location information. In other embodiments, some of the processing and memory resources identified in FIG. 1B can be shared between the control circuitry 136 and a companion processing module embodied in, for example, a mobile device communicatively coupled to the NED device 2.

Next is described an embodiment of an apparatus including at least three gratings. At least one of the gratings is a non-output diffraction grating (e.g. input grating, fold grating) and at least one of the gratings is an output diffraction grating. At least one of the gratings is an active grating which can be switched on and off. The embodiment in FIG. 3 uses three active gratings, but another combination can use a passive grating as well.

Figure 2:
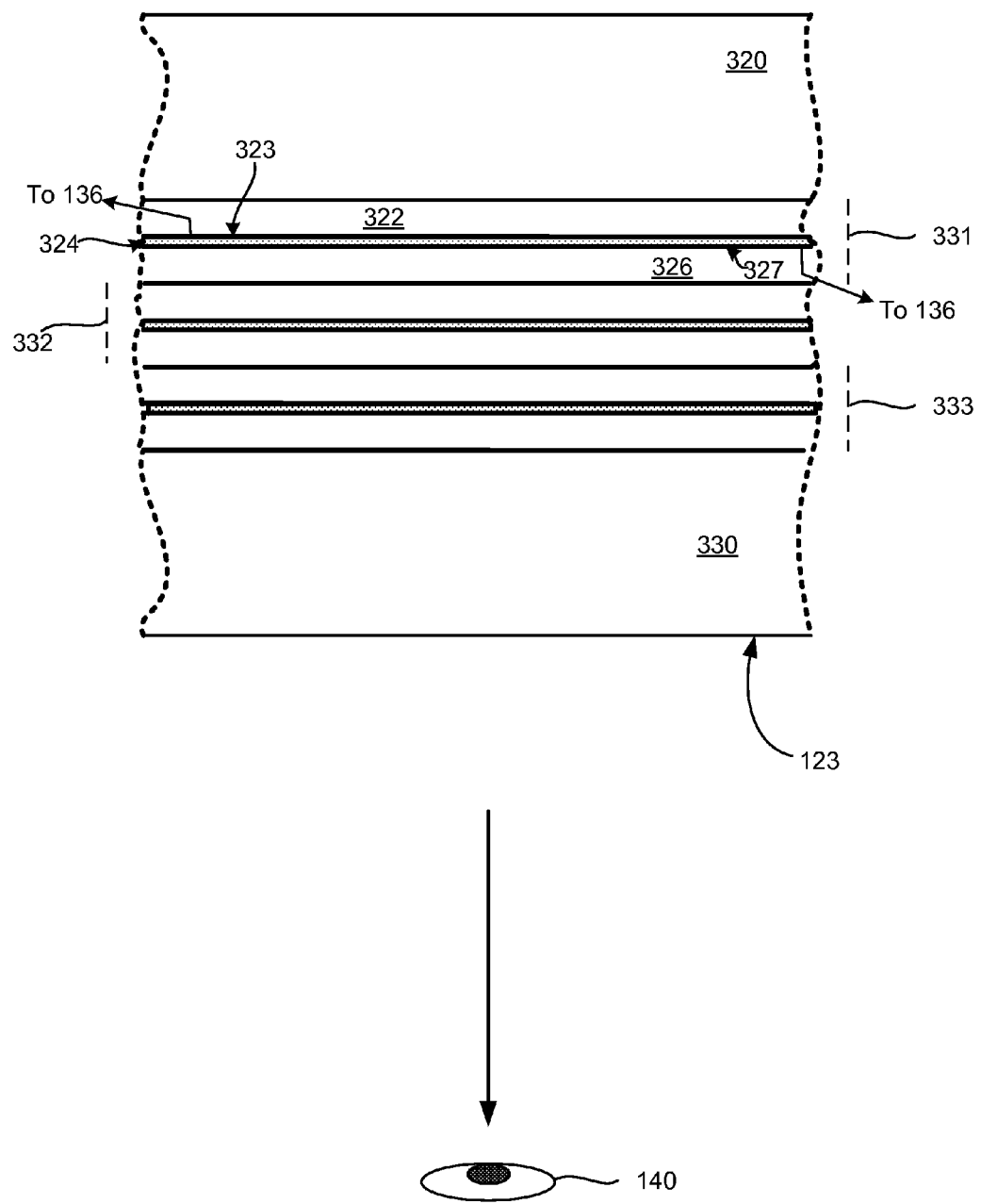
FIG. 2 illustrates a block diagram of a portion of a waveguide display in a NED device comprising an embodiment of an apparatus for using grating pairings for generating FOV tiles in a time sequence.

FIG. 2 illustrates a block diagram of a portion of a waveguide display in a NED device comprising an embodiment of an apparatus using grating pairings for generating FOV tiles in a time sequence. This is a top view. In this embodiment, the apparatus comprises three stacked electrically switchable Bragg grating (ESBG) layers 331, 332, 333. From the user eye area 140, layer 333 is closest to the user eye area followed by layer 332 and then layer 331. These ESBGs are also thick phase gratings which get their name by being about 2 to 4 microns (um) thick, which is thick compared to the wavelength band of visible light which is about half a micron thick.

A portion of a waveguide 123 is illustrated, but the illustrated layers can extend the length of the waveguide in some embodiments. Waveguide substrate layers 330 and 320 are each about 0.5 millimeters (mm) thick. To avoid overcrowding the drawing, just the inner layers of grating layer 331 are labeled, but the other layers 332 and 333 have the same structure. Layer 322 is a glass layer, for example approximately 100 to 200 um thick and has an indium tin oxide (ITO) coating 323. Other types of conductive, transparent coatings may also be used as transparent electrodes. In this example, the ITO coatings act as transparent electrodes and are communicatively coupled to the active grating controller 249 of the control circuitry. For example, the connections may be made through the surrounding eyeglass frame which is not shown. Next is a very, very thin layer 324, for example 2 to 4 microns (um) of a holographic polymer dispersed liquid crystal (HPDLC) mixture which is the thick phase grating is activated and deactivated responsive to electrical control signals from the ITO coatings. The HPDLC mixture is a mixture of photopolymerizable monomers and liquid crystal material which has been holographically processed. The grating layer 324 is in contact with a second ITO coating 327 which is coated on another thin layer 326 of about 100 um to 200 um glass. In this example, layer 326 would be bonded to another similar glass layer 322 of an adjacent grating layer 332.

In this example, the grating layers extend the length of the waveguide. In some embodiments, one or more ITO coating or film layers can activate portions of a HPDLC layer at a time based on one or more patterns of the one or more ITO film layers (323, 327) on an adjacent glass layer, e.g. 322, 326, interfacing with the HPDLC layer 324. In other embodiments, a grating layer may not be continuous along the waveguide, thus having spatially separate gratings. For example, grating layers can be formed in sections bonded together. Some of the sections were formed with the grating layer and some are filled with other than the HPDLC mixture, for example, the same glass of transparent layers 322, 326 with the same index of refraction.

ESBG devices may be fabricated by first placing a thin film of HPDLC mixture including the photopolymerizable monomers and liquid crystal material between parallel glass plates. As noted above, one or both glass plates (e.g. 322, 326) support electrodes, typically transparent indium tin oxide (ITO) films, for applying an electric field across the HPDLC layer. A thick phase grating is then recorded as a hologram by illuminating the liquid material with two mutually coherent laser beams, which interfere to form the desired grating structure. During the recording process, the monomers polymerize, and the PDLC mixture undergoes a phase separation, creating regions densely populated by liquid crystal microdroplets, interspersed with regions of clear polymer. The alternating liquid crystal-rich and liquid crystal-depleted regions form fringe planes of the volume grating. The resulting thick phase grating can exhibit very high diffraction efficiency, which may be controlled by the magnitude of the electric field applied across the HPDLC layer.

In the example of FIG. 2, without an electric field being applied, the orientation of liquid crystals in the ESBG forms the fringe planes. During operation of the waveguide display, when an electric field is applied to the grating via transparent electrodes, the orientation of the liquid crystals is changed causing the refractive index modulation of the fringes to reduce, the grating diffraction efficiency to drop to very low levels, and the HPDLC layer to appear transparent to P polarized light transmitted within the waveguide. The diffraction efficiency of the device can be electronically adjusted over a continuous range, for example from near 100% efficiency in some examples with no voltage applied to essentially zero efficiency with a sufficiently high voltage applied. The materials can also be engineered to work in reverse mode, i.e. to switch on with an applied voltage potential.

Figure 3A:
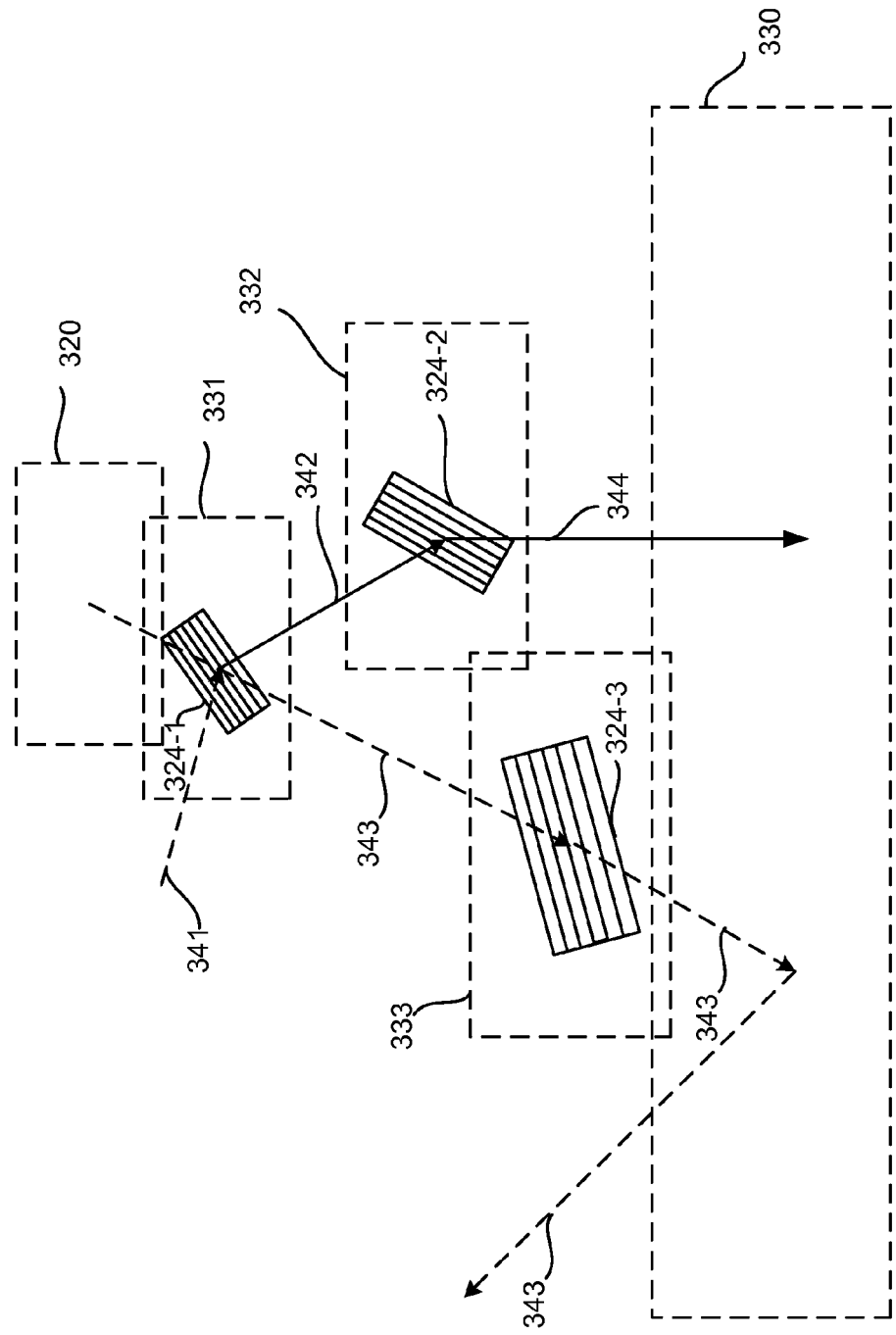
FIGS. 3A and 3B illustrate an embodiment of a grating configuration within a waveguide display comprising a non-output diffraction grating and a plurality of active output diffraction gratings for generating FOV tiles in a timed sequence.
Figure 3B:
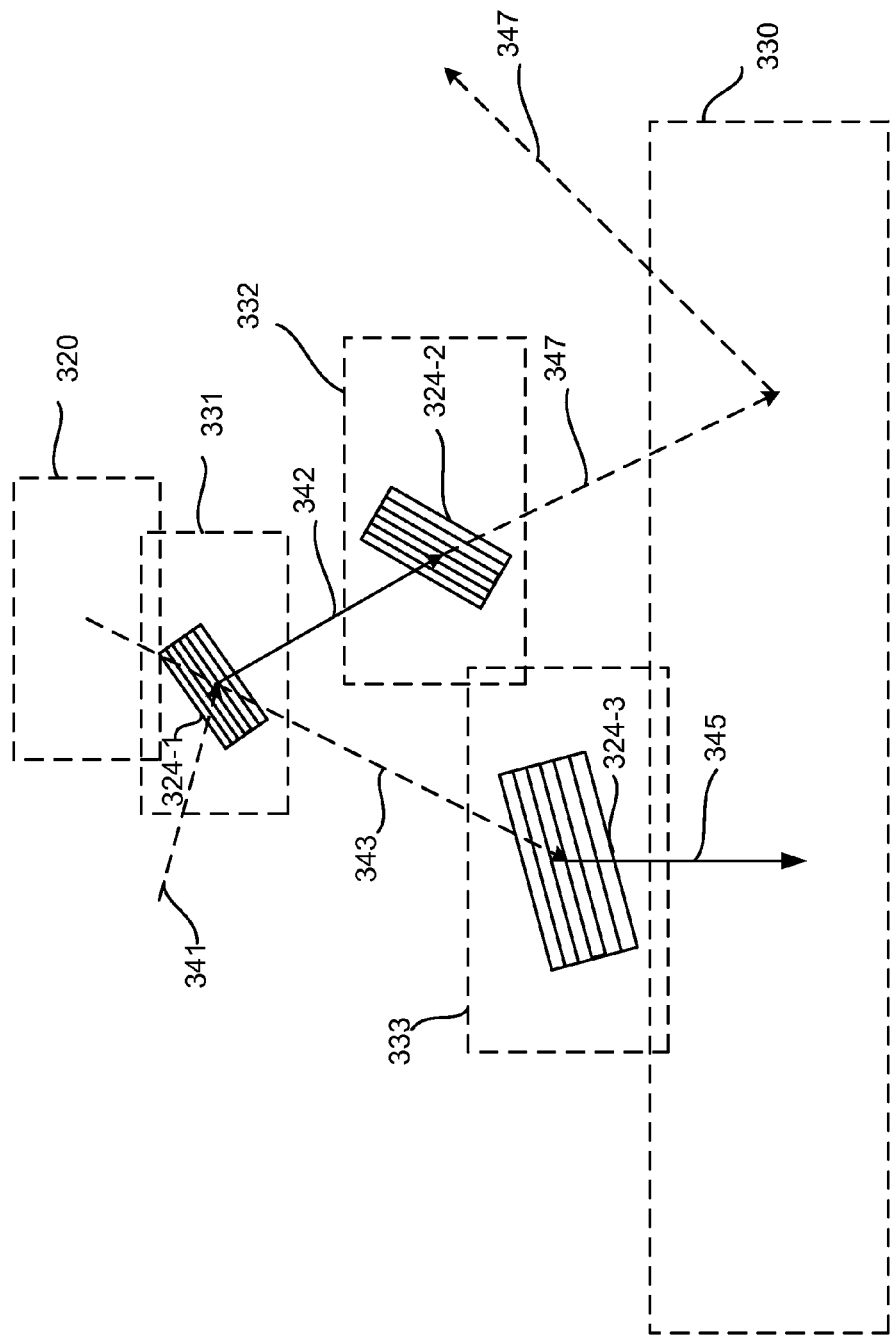

FIGS. 3A and 3B illustrate an embodiment of a grating configuration within a waveguide display comprising a non-output diffraction grating and a plurality of active output diffraction gratings which are active in different FOV tile time periods of a FOV update time period for directing light towards a user eye area 140. As mentioned above, the activation of each grating pairing produces a FOV tile or portion of an image displayed for a time period. The time periods for the tiles may be included in a FOV update time period which is a larger time period for displaying an entire display FOV, for example a frame update time period. In the context of the embodiment of FIG. 2 in a view from a user eye area 140, the PDLC layer 324-1 in layer 331 implements a fold grating in this example. Each of the active output diffraction gratings in layers 332 and 333 forms a separately activated grating pairing with the fold grating, which again is an example of a non-output grating. So for the total number of three gratings, a product of 2×1=2 grating pairings are formed.

FIG. 3A illustrates an example of light being diffracted by a first grating pairing during its respective tile time period. During a first tile time period, the exemplary reflective fold grating layer 331 diffracts incident light 341 received within its angular bandwidth of incidence. Grating 324-1 diffracts incident light 341 in a direction in the waveguide 123 illustrated as diffractive ray 342. Light as illustrated by ray 343 is outside the angular bandwidth of incidence, and so it passes through grating 324-1 undiffracted. A switchable diffraction grating 324-2 in layer 332 receives the diffracted light 342 in its respective angular bandwidth of incidence, either directly from the fold grating 331 or indirectly after propagating through the waveguide in accordance with total internal reflection. The output grating 324-2 diffracts the incident light resulting in a change of direction of representative ray 342 as diffracted light illustrated by representative ray 344 out of the waveguide, through substrate layer 330 towards eye area 140. The output grating 324-2 is a transmissive grating in this example. Reflective gratings or a combination of reflective and transmissive gratings can be used as well. During this first tile time period, ITO coating electrodes apply an electrical signal (e.g. voltage) to grating 324-3 in layer 333 to reduce its diffraction efficiency, so diffraction by thick phase grating 324-3 is minimal. In other words, diffraction grating 324-3 is effectively deactivated. Representative dashed light ray 343 traversing through the waveguide and reaching grating layer 324-3 within the angular bandwidth of incidence for 324-3 passes through layer 324-3 undiffracted with high efficiency and continues propagating through the waveguide as illustrated by ray 343 continuing to the left.

FIG. 3B illustrates an example of light being diffracted by a second grating pairing during its respective tile time period. In a second tile time period the output grating 324-2 in layer 332 is effectively deactivated, and the grating layer 324-2 becomes effectively transparent. Light 342 diffracted by the fold grating 324-1 in layer 331 now transmits undiffracted through layer 332 as illustrated by dashed representative ray 347 and propagates down the waveguide 123 as illustrated by ray 347 continuing to the right. This time, active grating 324-3 output coupling grating layer 333 is active meaning it is diffracting light with at least a predetermined efficiency level, for example, at least 50%. In one scenario, undiffracted ray 343 propagates along the waveguide and returns along a TIR reflection path and transmits through the fold grating layer 331 as it does not intersect the fold layer within the angular bandwidth of incidence for the fold grating. However, the light represented by ray 343 intersects with the grating 324-3 in layer 333 within its angular bandwidth of incidence and is thus diffracted out of the waveguide as illustrated by representative solid ray 345 towards the user eye area 140.

In this example, three active ESBGs are used. However, a combination of active and passive gratings can be used. For example, the fold grating in layer 331 could have been implemented as a passive grating in the examples of FIGS. 3A and 3B.

Figure 3C:
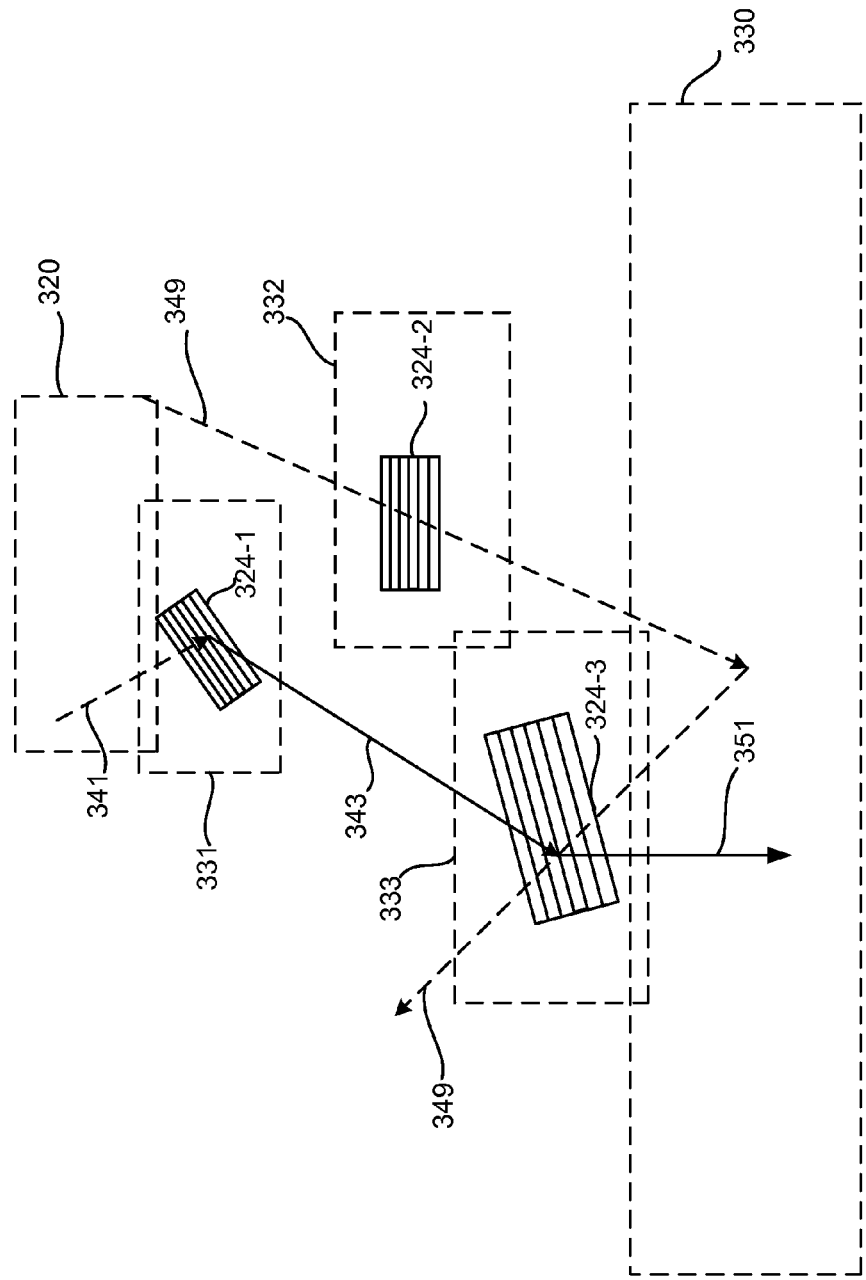
FIGS. 3C and 3D illustrate an embodiment of a grating configuration within a waveguide display comprising an output diffraction grating and a plurality of active non-output diffraction gratings for generating FOV tiles in a timed sequence.
Figure 3D:
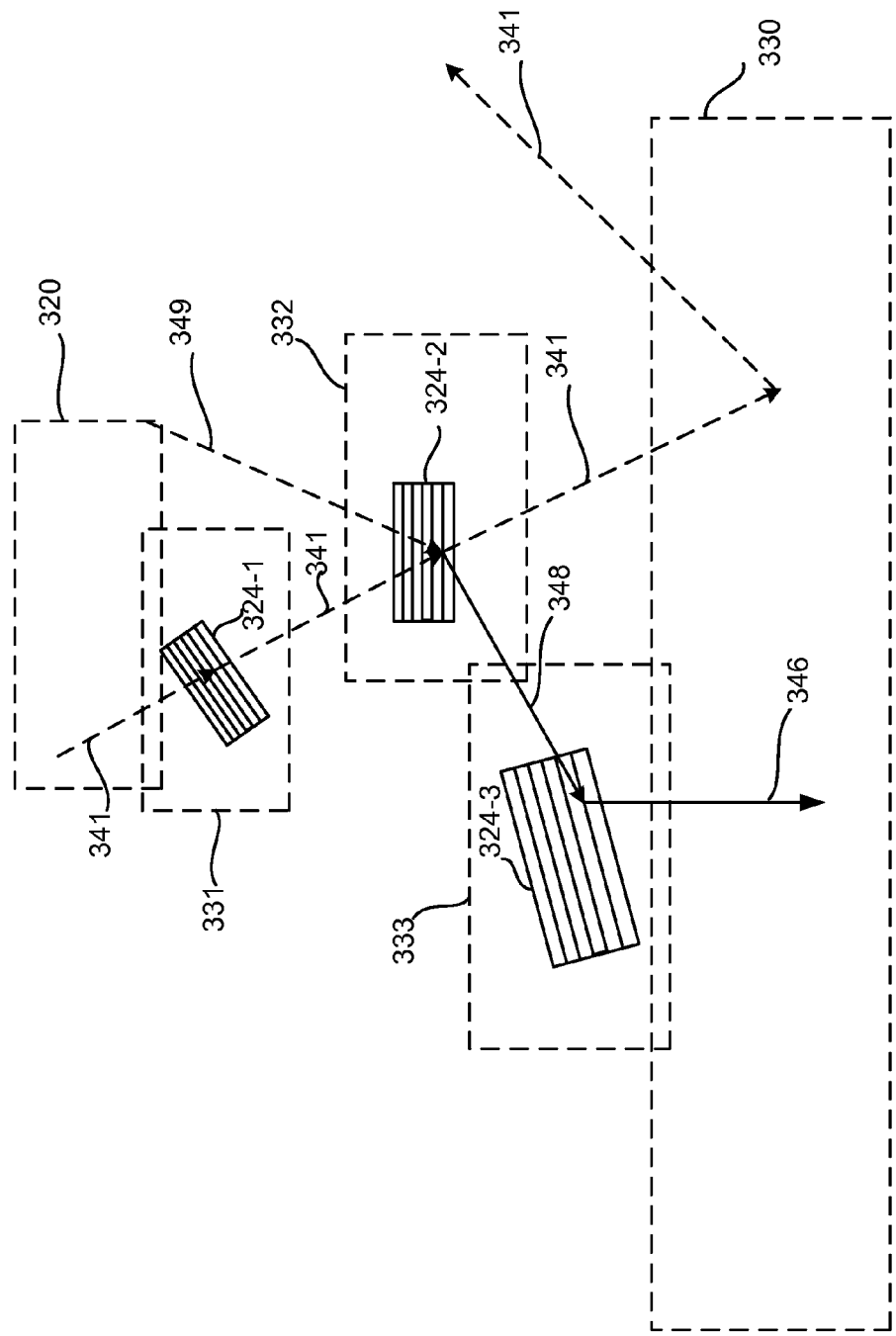

FIGS. 3C and 3D illustrate an embodiment of a grating configuration within a waveguide display comprising an output diffraction grating and a plurality of active non-output diffraction gratings for generating FOV tiles in a timed sequence. In this example, there are two active non-output diffractive gratings (324-1, 324-2) and an active output diffractive grating (324-3) as the ESBGs from FIG. 2 are being used for illustrative purposes. However, the output grating could be a passive grating, also referred to as a fixed grating, in other examples. Passive and fixed gratings are optical elements which are not electrically controlled. FIG. 3C illustrates an example of light being diffracted by a first grating pairing during a first tile time period. Non-output diffraction grating 324-1 in grating layer 331 diffracts light received within its angular bandwidth of incidence illustrated by representative incident ray 341 and is diffracted at an angle as illustrated by representative diffracted ray 343. Although not shown in these examples, depending on the diffraction efficiency, a portion of the light in the angular bandwidth of incidence passes through the grating 324-1 undiffracted and continues to propagate down the waveguide. In this first tile period, non-output diffraction grating 324-2 is not active so that its diffraction efficiency is near zero, and it appears transparent or nearly transparent to the user. The output diffraction grating 324-3 is active. Diffracted ray 343 intersects grating layer 324-3 and is diffracted out of the waveguide toward the user's eye as illustrated by diffracted ray 351.

Figure 3E:
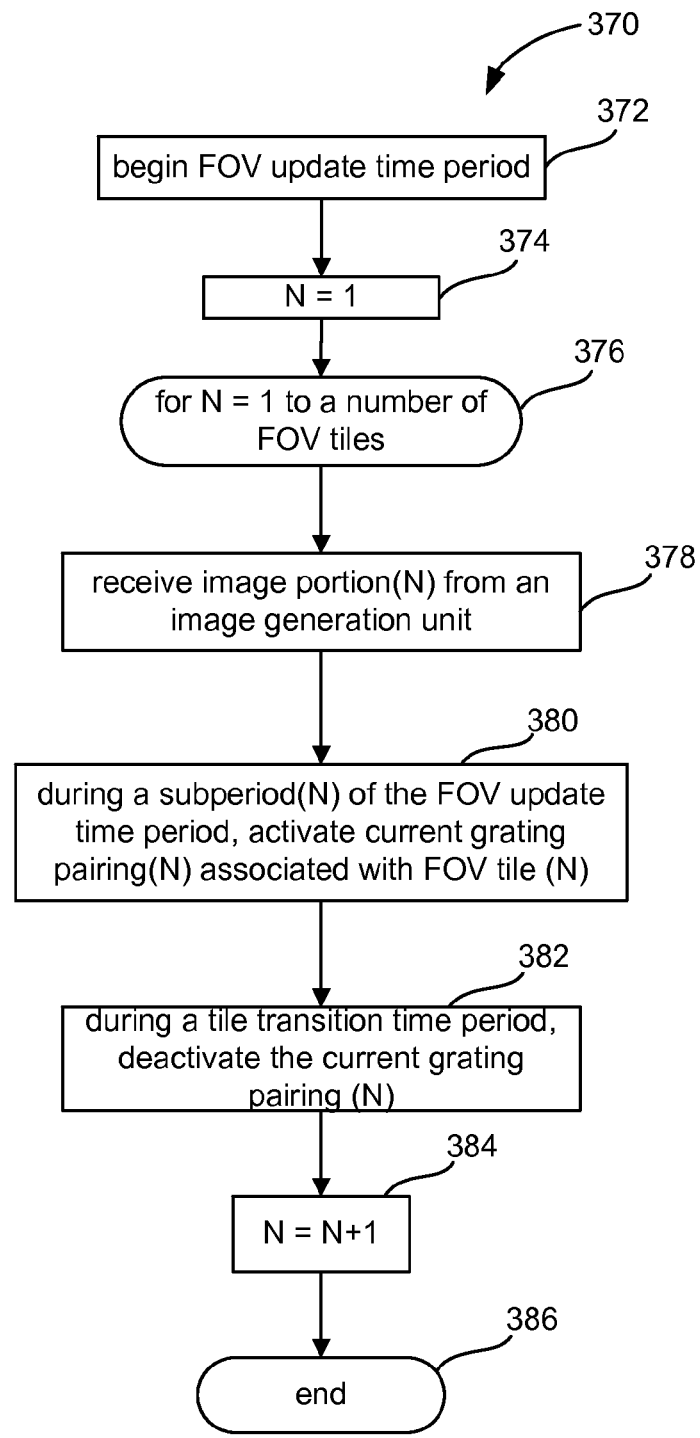
FIG. 3E is a flowchart of an embodiment of a method for displaying image data in field of view (FOV) tiles using one or more diffraction grating pairings in accordance with the technology.

FIG. 3D illustrates an example of light being diffracted by a second grating pairing during a second tile time period. In this embodiment, for the second tile time period, gratings 324-2 and grating 324-3 are active. Grating 324-1 has been deactivated. Ray 341 passes through grating 324-1 and is diffracted by grating 324-2 in layer 332 as illustrated by representative ray 348. Propagating ray 349 in this second tile time period is now diffracted by the activated grating 324-3 in layer 333 as illustrated by representative diffractive ray 346 extending through substrate layer 330 toward the user eye area 140. FIG. 3E is a flowchart of an embodiment 370 of a method for displaying image data in field of view (FOV) tiles using one or more diffraction grating pairings. The steps of the method embodiments may be repeated for each FOV update time period. In step 372, a FOV update time period begins, for example a frame update time period as clocked by a timer of a processor of the control circuitry. A for loop is used for illustrative purposes to show the iterative nature of processing a number N of FOV tiles. In this example, a counter N is initialized in 374, and the for loop begins in step 376 for N=1 to a number of FOV tiles. The waveguide 123 receives an image portion for the FOV tile N, referred to here as image portion (N), from an image generation unit in step 378. For example, the image portion (N) may be optically coupled from an image generation unit like 120 in FIG. 1 via a lens system 122 alone or in combination with an input grating. During a subperiod (N) of the FOV update time period, in step 380, a current grating pairing (N) associated with FOV tile (N) is activated. During a tile transition time period, the current grating pairing (N) is deactivated in step 382. In some examples, a tile transition period may be a very short time period between the tile subperiods and in other examples, a designated portion of each subperiod. In step 384, the counter N is incremented, and the loop steps 376, 378, 380, 382 and 384 repeat until the counter check in step 376 fails, and the loop ends as per step 386, but will be repeated for subsequent FOV update time periods.

The combinations of gratings can include more gratings than the configurations illustrated. For example, there can be 2 non-output gratings and 3 output gratings resulting in a product of 6 grating pairings. Or there could be 2 of each type of grating making 4 grating pairings in another example. In another example, there could be three of each type of grating resulting in 9 grating pairings. As previously mentioned, the total number of grating pairings is equal to a product of a total number of the non-output diffraction gratings and a total number of the output diffraction gratings in the number of grating pairings.

Figure 5A:
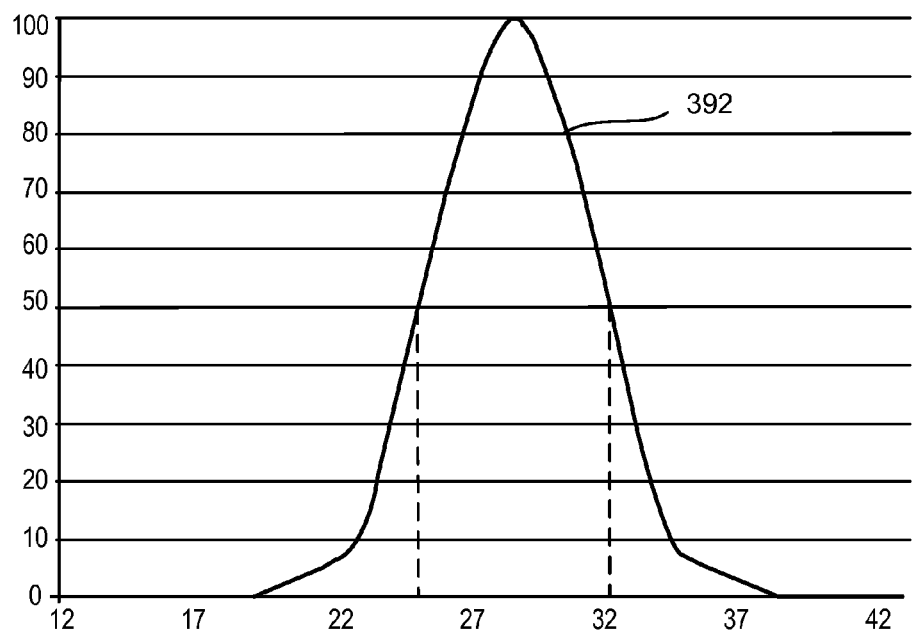
FIG. 5A illustrates a typical curve of grating diffraction efficiency versus field angle for a Bragg grating.
Figure 5B:
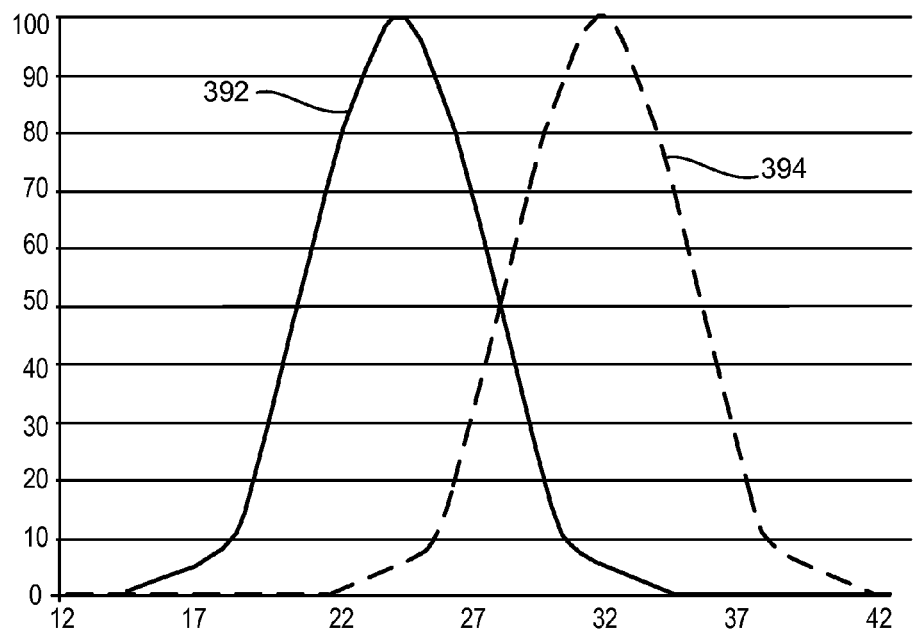
FIG. 5B illustrates respective curves of grating diffraction efficiency versus field angle of the Bragg grating in FIG. 5A and another Bragg grating.
Figure 5C:
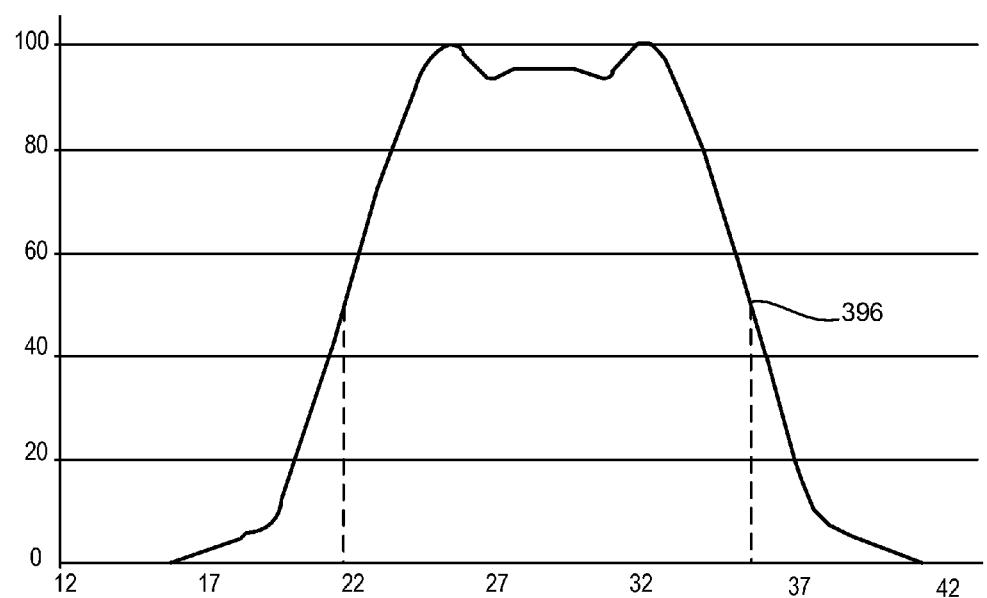
FIG. 5C illustrates a curve combining the hologram diffraction efficiency versus field angle of the two Bragg gratings represented in FIG. 5B.

The discussion next turns to increasing the angular diffraction bandwidth of a grating itself by combining different K-vectors in a same grating. Each different K-vector is designed to diffract light more efficiently over a predetermined set of angles and combining multiplexing the K-vectors broadens the overall angular bandwidths of incidence and diffraction for the diffraction grating. This allows for increases in both the horizontal and vertical dimensions of FOV tiles allowing for less gratings to be used overall. FIGS. 5A, 5B and 5C illustrate data curves with respect to Bragg gratings but the discussion applies to other types of gratings as well, for example, surface relief gratings.

Figure 4:
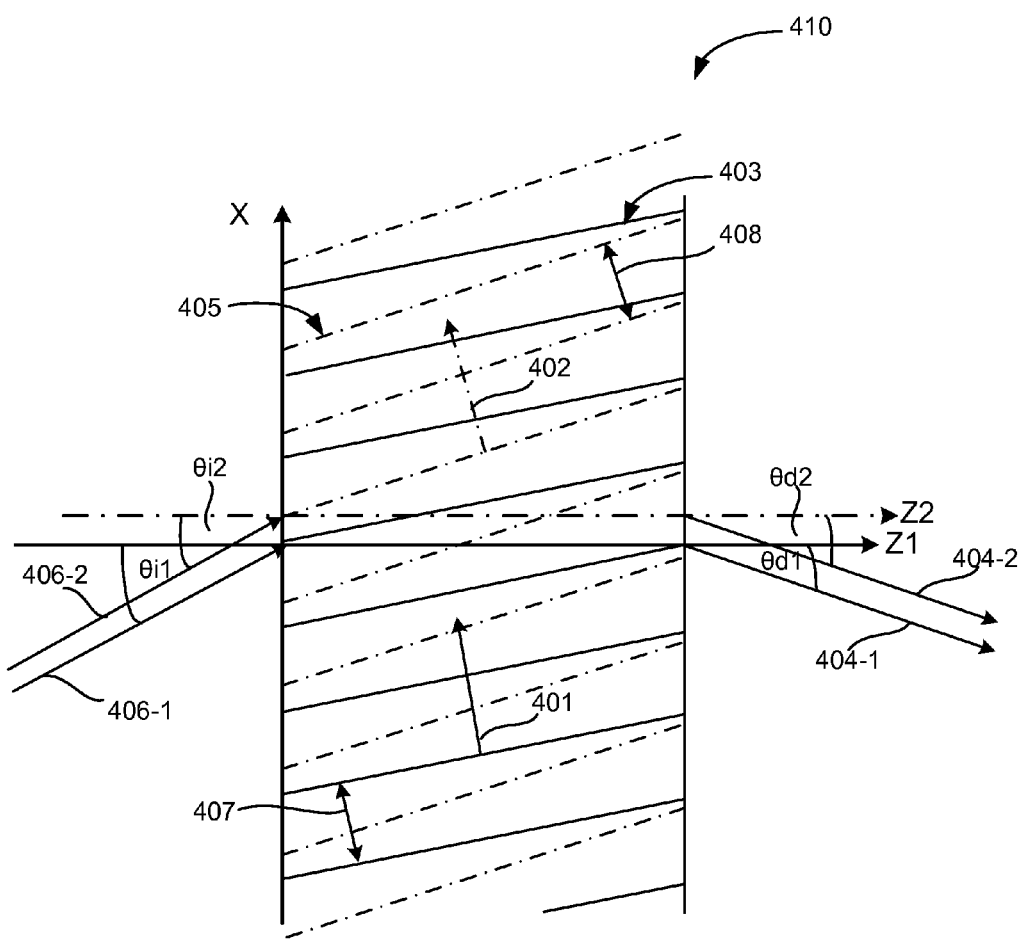
FIG. 4 is an illustration depicting multiplexed K vectors in a volume grating.

FIG. 4 is an illustration depicting exemplary multiplexed K vectors in a volume grating. An X axis and respective Z axes, Z1 and Z2, for the different gratings are provided for reference. Volume multiplexed grating 410 has multiplexed gratings, a first one 403 of which is depicted by solid diagonal lines and has a K-vector 401 and a period 407. The second multiplexed grating 405 is illustrated by dot-dash lines and has a K-vector 402 and a period 408. Grating period 407 is the same distance as grating period 408. The K-vectors differ in direction. The angular bandwidth of incidence θi for the multiplexed gratings covers the angular range including the overlapping θi1 and θi2. The angular bandwidth of diffraction θd for the multiplexed gratings covers the angular range including the overlapping θd1 and θd2. Rays representing light are used for illustrative purposes. Incident ray 406-1 intersects the grating 403 at the boundary of angular bandwidth θi1 and is diffracted as ray 404-1 at the boundary of the angular diffraction bandwidth θd1. Incident ray 406-2 intersects the grating 405 at the boundary of angular bandwidth θi2 and is diffracted as ray 404-2 at the boundary of the angular diffraction bandwidth θd2. More than two gratings can be multiplexed. In operation, when grating 410 is activated, both of the multiplexed gratings 403 and 405 are active, thus providing the broader incidence and diffraction bandwidths.

FIG. 5A illustrates a typical curve 392 of a grating diffraction efficiency (vertical axis) versus field angle (horizontal axis). A problem with creating a tiled FOV display with this efficiency profile is that the edges of the field of view of each tile is lower than the peak. One technique for evening out the efficiency profile is to design an image generation unit 120 to have an inverse shape of efficiency versus field angle so that the output is a product of the two and therefore flatter than this shape. However, this results in putting more photons into an area of low efficiency and therefore decreasing the overall system efficiency. Enhancing the efficiency of the edge of the tile is desired. Also illustrated by the dashed horizontal lines is that an angular range of about 7 degrees between approximately 25 degrees and 32 degrees has a diffraction efficiency of 50% or greater.

FIG. 5B illustrates respective curves 392 and 394 of grating diffraction efficiency (vertical axis) versus field angle (horizontal axis) of the Bragg Grating in FIG. 5A and another Bragg Grating with the same grating spacing but a different K-vector so that the hologram efficiencies peak at different angles.

FIG. 5C illustrates a curve 396 combining the grating diffraction efficiency (vertical axis) versus field angle (horizontal axis) of the two Bragg Gratings represented in FIG. 5B. In the illustrated exemplary profile, the diffraction efficiency region of at least 50% or better as illustrated by the vertical dashed lines covers a range of about 13 degrees from 22 degrees to 35 degrees. The combination of the two Bragg gratings as illustrated also has a very high diffraction efficiency of over 90% in this example, near the center ten degrees, e.g. 23 to 33 degrees. However, in a waveguide display, lower diffraction efficiencies are useful. Different grating pairings along the width of the waveguide display, e.g. from the input lens system 122 towards the bridge 104, can recapture undiffracted light and provide the eye with a larger exit pupil. Each FOV tile is a little wider, e.g. 13, 14 or 15 degrees as opposed to just 7-10 degrees when diffraction efficiencies from 50% or more are used. Two or more overlapping gratings can be implemented with multiplexed K-vectors.

Figure 6A:
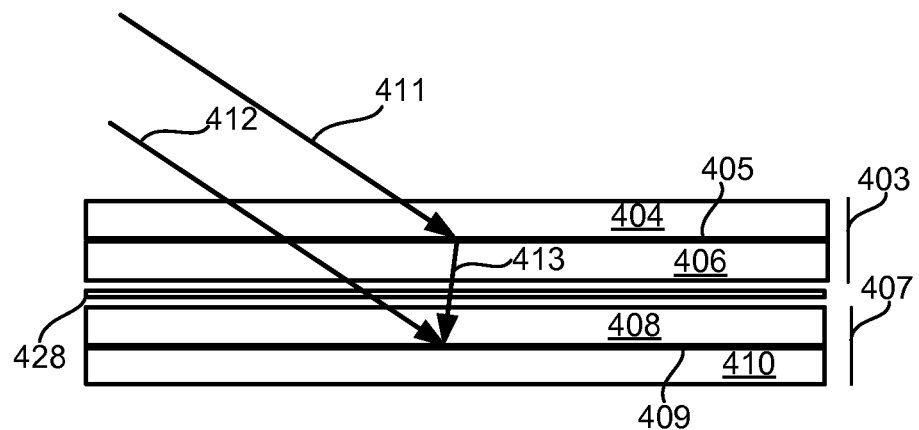
FIGS. 6A and 6B illustrate examples of steps in a contact copy hologram recording process for generating a diffraction grating with multiplexed K-vectors.
Figure 6B:
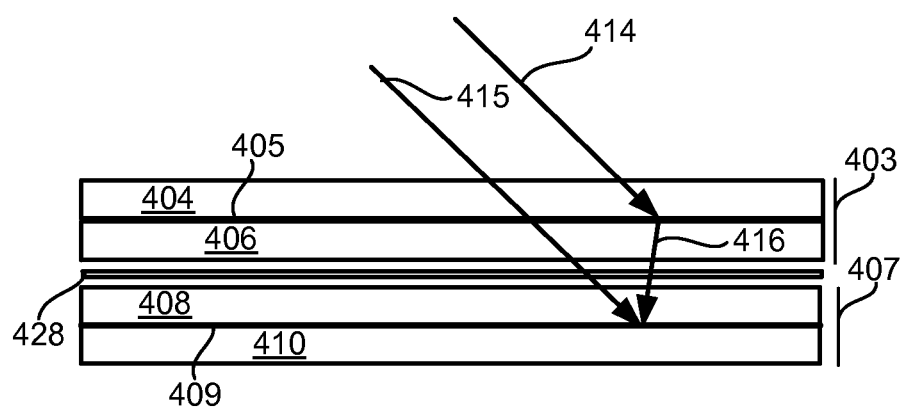

FIGS. 6A and 6B illustrate examples of steps in a contact copy hologram recording process for generating a diffraction grating including at least two different multiplexed K-vectors, and thus increasing the overall angular bandwidth of the grating. Additionally, a grating with multiplexed K-vectors may be formed in passive gratings like surface relief gratings as well as active gratings like switchable Bragg gratings.

FIG. 6A illustrates an example of recording a first grating of multiplexed gratings using contact copy hologram recording. A grating can be implemented as a hologram, so references to a hologram are references to a grating. For these examples of multiple beam hologram recording, the master hologram has an angular bandwidth wide enough to be able to generate a diffracted beam covering the range of angles of one FOV tile. In this example, diffraction grating layer 403 includes a holographic medium 405 in which the master hologram (grating) has been recorded. For example, if 403 is a switchable Bragg grating layer, the holographic medium is a PDLC grating layer 405 sandwiched between two thin, 100 um-200 um, layers 404 and 406 of optically transparent material coated with ITO films or coatings (not shown) like 323 and 327. The copy hologram layer 407 in which the hologram is being recorded also includes a holographic recording medium 409, for example, a PDLC grating layer, sandwiched between two thin, 100 um-200 um, layers 408 and 410 of optically transparent material coated with ITO films or coatings (not shown) like 323 and 327.

The master layer 403 and copy layer 407 are aligned. In this embodiment, an optional optical edge filter 428, for example embodied as an optical edge coating, is aligned between the master grating layer 403 and the copy grating layer 407. Other embodiments may not use an optical edge filter. The optical edge filter 428 balances the intensity of the primary beam, e.g. 411 and 414, and the secondary beam, also referred to as the reference beam, e.g. 412 and 415, during contact copy recording. Because of the wide angular bandwidth of the master, the peak diffraction efficiency and the diffraction efficiency at the edge of the field of view will typically be low. Since the diffraction efficiency of the master hologram is likely to be fairly low, the zero order intensity will be much higher than the first order when they intercept at the copy hologram recording medium. The imbalance in the recording may diminish the modulation of the hologram, for example by diminishing migration of liquid crystals in the PDLC example. Employing an edge filter where the zero order is reflected away from the copy grating layer 407 allows the recording beams to be balanced.

In contact copy hologram recording, the steps are automatically performed by machines for precision. A laser beam encompassing the wavelength range over which the grating is designed to work is used as a light source. A first light beam 411 is directed through the master hologram layer 403 causing a diffracted ray 413 to interact with the holographic material 409, the PDLC layer, in this example. A second light beam 412 is simultaneously directed with the first light beam 411 at the master hologram (grating) layer 403. The second light beam 412 is usually from the same light source as the first light beam 411, and is undiffracted. Beams 411 and 412 are coherent or in phase. The beams do not have to be plane beams. They can come from point sources for which it is possible to further optimize the copy hologram performance so that the peak efficiency occurs at the center of the exit pupil of the display.

The intersection of the diffracted beam 411 and undiffracted beam 412 in the copy layer 407 creates a standing wave which is recorded in the holographic recording medium in the copy grating layer 409. The standing wave determines the period of the copy grating layer 409 which will be the same as the master grating layer 405. Because the copy grating layer 409 has the same period as the master grating layer, the copy grating layer 409 has the same power as the master. However, the angle of incidence of the laser beam 411 in the recording process determines the K-vector in the copy grating layer 409.

FIG. 6B illustrates an example of recording a second hologram, which is a second grating, of multiplexed holograms (gratings), and thus multiplexed K-vectors, using contact copy hologram recording. Another set of coherent laser beams 414 and 415 from a same light source are directed at a different angle of incidence through the master hologram layer 403. Beam 414 is diffracted by the master hologram 405 resulting in diffracted beam 416. The standing wave produced by 414 and 415 is recorded in copy grating layer 409. The grating period between the master and the copy remain the same. However, there are now two K-vectors due to the multiplexed gratings which exist across the entire copy grating layer 409. More than two K-vectors can be recorded and multiplexed. As mentioned above, multiplexed gratings can be recorded in types of gratings other than a SBG, for example, in a surface relief grating Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus using grating pairings for generating field of view (FOV) tiles for a waveguide display comprising:
   a waveguide display;
   at least three diffraction gratings positioned within the waveguide display including at least one output diffraction grating for coupling image light out from the waveguide and at least one non-output diffraction grating for coupling image light for traversal along the waveguide;
   the at least three diffraction gratings forming a total number of grating pairings equal to a product of a total number of the non-output diffraction gratings and a total number of the output diffraction gratings in the number of grating pairings, each grating pairing including one non-output grating and one output grating, and each grating pairing includes at least one active grating;
   each grating pairing includes at least one grating also in another grating pairing of the total number of grating pairings;
   a number of FOV tiles equal to the number of grating pairings; and
   control circuitry communicatively coupled to the at least one active grating in each pairing for activating each pairing during a respective tile time period of a larger FOV update time period, and deactivating each pairing during respective tile time periods when other grating pairings are activated for generating the number of FOV tiles in the FOV update time period.

2. The apparatus of claim 1 wherein the at least one non-output diffraction grating includes at least one fold grating.

3. The apparatus of claim 1 wherein the at least one non-output diffraction grating includes at least one input grating.

4. The apparatus of claim 1 wherein the at least one active grating is a switchable Bragg grating.

5. The apparatus of claim 1 wherein the waveguide display is a near-eye display.

6. The apparatus of claim 1 further comprising:
a multiplexed grating of the at least three diffraction gratings includes multiplexed K-vectors, each K-vector diffracting a different predetermined set of angles within an angular bandwidth of incidence for the multiplexed grating.

7. The apparatus of claim 6 wherein the multiplexed grating is a passive grating.

8. The apparatus of claim 6 wherein the multiplexed grating is an active grating.

9. A waveguide display system including at least one grating with multiplexed K-vectors comprising:
a waveguide display;
at least three diffraction gratings positioned within the waveguide display including at least one output diffraction grating for coupling image light out from the waveguide and at least one non-output diffraction grating for coupling image light for traversal along the waveguide;
at least three diffraction gratings forming a total number of grating pairings equal to a product of a total number of the non-output diffraction gratings and a total number of the output diffraction gratings in the total number of grating pairings, each pairing including one non-output grating and one output grating, and the pairing includes at least one active grating;
each grating pairing includes at least one grating also in another grating pairing of the total number of grating pairings;
a number of field of view (FOV) tiles equal to the number of pairings;
a multiplexed grating of the at least three diffraction gratings includes multiplexed K-vectors providing greater than a ten degree FOV tile; and
control circuitry communicatively coupled to at least one active grating in each pairing for activating each pairing during a respective tile time period of a larger FOV update time period, and deactivating each pairing during respective tile time periods when other grating pairings are activated for generating the number of FOV tiles in the FOV update time period.

10. The waveguide display of claim 9 wherein the waveguide display is a near-eye display.

11. The waveguide display of claim 9 wherein the at least three diffraction gratings are active gratings.

12. The waveguide display of claim 9 wherein the at least one active grating is an electrically switchable Bragg grating.

13. The waveguide display of claim 9 wherein the number of non-output diffraction gratings includes a fold grating.

14. The waveguide display of claim 9 wherein the multiplexed grating is a passive grating.

15. The waveguide display of claim 9 further comprising:
each K-vector diffracting a different predetermined set of angles within an angular bandwidth of incidence for the multiplexed grating; and
the predetermined sets of angles overlap within the angular bandwidth of incidence for the multiplexed grating.

16. The waveguide display of claim 15 further comprising:
the multiplexed grating including the multiplexed K-vectors has a diffraction efficiency of at least 90% for a center portion of about 10 degrees of the angular bandwidth of incidence for the multiplexed grating.

17. A method for displaying image data for a waveguide display in time sequenced field of view (FOV) tiles using diffraction grating pairings, each diffraction grating pairing being associated with a respective FOV tile comprising:
(a) receiving by the waveguide display from an optically coupled image generation unit an image portion associated with the FOV tile for display during a time period which is a subperiod of a FOV update time period;
(b) activating a current grating pairing associated with the FOV tile, including a non-output diffraction grating and an output diffraction grating during the time period;
(c) during a tile transition time period, deactivating the current grating pairing; and
repeating steps (a) through (c) for a next grating pairing until each FOV tile has been displayed in the FOV update time period, wherein at least one grating in each grating pairing is also in another grating pairing.

18. The method of claim 17 wherein the output diffraction grating is an active grating and further comprises multiplexed K-vectors which are activated and deactivated simultaneously.

19. The method of claim 17 wherein the output diffraction grating is a passive grating and further comprises multiplexed K-vectors.

20. The method of claim 15 wherein the FOV update time period is a frame update time period.

* * * * *